(12) United States Patent
Donahue

(10) Patent No.: US 9,470,179 B2
(45) Date of Patent: Oct. 18, 2016

(54) PISTON ASSEMBLY FOR A RECIPROCATING ENGINE

(71) Applicant: GENERAL ELECTRIC COMPANY, Schenectady, NY (US)

(72) Inventor: Richard John Donahue, West Bend, WI (US)

(73) Assignee: General Electric Company, Schenectady, NY (US)

( * ) Notice: Subject to any disclaimer, the term of this patent is extended or adjusted under 35 U.S.C. 154(b) by 1 day.

(21) Appl. No.: 14/298,864

(22) Filed: Jun. 6, 2014

(65) Prior Publication Data

US 2015/0354497 A1 Dec. 10, 2015

(51) Int. Cl.
*F16J 9/08* (2006.01)
*F02F 3/24* (2006.01)

(52) U.S. Cl.
CPC ... *F02F 3/24* (2013.01); *F16J 9/08* (2013.01)

(58) Field of Classification Search
CPC .................. F16J 9/00; F16J 9/08; F16J 9/12
See application file for complete search history.

(56) References Cited

U.S. PATENT DOCUMENTS

| | | | |
|---|---|---|---|
| 1,467,256 A | 9/1923 | Thomson | |
| 1,815,418 A | 7/1931 | O'Bryan | |
| 1,822,101 A | 9/1931 | Lewis | |
| 1,936,430 A | 11/1933 | Godron | |
| 1,959,566 A | 5/1934 | Brubaker | |
| 2,233,723 A | 3/1941 | Ballard | |
| 2,328,912 A | 9/1943 | Kotzback | |
| 2,566,603 A | 9/1951 | Dykes | |
| 2,591,176 A | 4/1952 | Mason | |
| 2,610,098 A | 9/1952 | Reiners | |
| 2,892,645 A * | 6/1959 | Tydeman | F16J 15/48 277/457 |
| 2,914,368 A * | 11/1959 | Farmer | F16J 15/56 188/106 R |
| 3,033,578 A * | 5/1962 | Kellogg | F16J 15/32 277/457 |
| 3,364,675 A | 1/1968 | Dorer | |
| 3,396,976 A * | 8/1968 | Alphonsus | F02G 1/0535 277/447 |
| 3,554,564 A | 1/1971 | Lassanske | |
| 3,608,911 A | 9/1971 | Prasse et al. | |

(Continued)

FOREIGN PATENT DOCUMENTS

| | | |
|---|---|---|
| DE | 102005061074 A1 | 6/2007 |
| DE | 102008014859 A1 | 10/2009 |

(Continued)

OTHER PUBLICATIONS

U.S. Appl. No. 14/298,867, filed Jun. 6, 2014, Donahue.

(Continued)

*Primary Examiner* — Gilbert Lee
(74) *Attorney, Agent, or Firm* — Fletcher Yoder, P.C.

(57) ABSTRACT

A power cylinder system for a reciprocating engine includes a piston with a top-most groove extending circumferentially about the piston. The top-most groove includes one or more channels spaced apart circumferentially about the top-most groove and extending inward from an outer perimeter of the piston assembly. The system also includes a ring positioned in the top-most groove, the ring including a top face, a bottom face, an inner circumferential face, and an outer circumferential face that tapers between the top face and the bottom face. A space is defined between a portion of the top-most groove and the inner circumferential face of the ring, and the space is in fluid communication with the one or more radial channels.

15 Claims, 6 Drawing Sheets

(56) References Cited

U.S. PATENT DOCUMENTS

| | | | |
|---|---|---|---|
| 3,667,443 A | | 6/1972 | Currie et al. |
| 3,806,137 A | | 4/1974 | Prasse et al. |
| 4,154,207 A | * | 5/1979 | Brehob ............... F16J 9/08 |
| | | | 123/193.6 |
| 4,235,447 A | | 11/1980 | Davison, Jr. |
| 4,358,121 A | | 11/1982 | Sand |
| RE3,295 E | | 4/1987 | Geffroy et al. |
| 4,669,369 A | | 6/1987 | Holt et al. |
| 4,681,326 A | | 7/1987 | Kubo |
| 4,736,586 A | * | 4/1988 | Kawajiri ............. F02G 1/0535 |
| | | | 277/451 |
| 4,836,093 A | * | 6/1989 | Wagner ............... F02F 3/00 |
| | | | 123/193.6 |
| 4,848,212 A | | 7/1989 | Kawano et al. |
| 5,083,536 A | * | 1/1992 | Ariga .................. F16J 9/08 |
| | | | 123/193.6 |
| 5,133,563 A | | 7/1992 | Casellato |
| 5,253,877 A | | 10/1993 | DeBiasse et al. |
| 5,285,755 A | | 2/1994 | Regueiro |
| 5,392,692 A | | 2/1995 | Rao et al. |
| 5,430,938 A | | 7/1995 | Rao et al. |
| 5,474,307 A | | 12/1995 | DeBiasse |
| 5,490,445 A | | 2/1996 | Rao et al. |
| 5,517,379 A | | 5/1996 | Williams et al. |
| 5,564,699 A | | 10/1996 | Lawrence et al. |
| 5,737,999 A | | 4/1998 | Ariga |
| 5,779,243 A | | 7/1998 | Hanlon |
| 6,131,503 A | | 10/2000 | Takashima |
| 6,213,474 B1 | | 4/2001 | Sameshima et al. |
| 6,378,482 B2 | | 4/2002 | Marcil |
| 6,536,385 B1 | | 3/2003 | Takashima |
| 7,068,011 B2 | | 6/2006 | Yang |
| 7,207,571 B2 | * | 4/2007 | Yoshida ............... F16J 9/206 |
| | | | 277/434 |
| 7,312,653 B2 | | 12/2007 | Chen et al. |
| 7,493,883 B2 | | 2/2009 | Takahashi |
| 7,642,748 B2 | | 1/2010 | Glosser, Jr. et al. |
| 7,730,866 B2 | | 6/2010 | Melchior |
| 7,740,448 B2 | | 6/2010 | Meyer et al. |
| 7,854,191 B2 | | 12/2010 | Kariya |
| 8,001,946 B2 | | 8/2011 | Leitl |
| 8,820,288 B2 | | 9/2014 | Kaiser et al. |
| 2002/0158609 A1 | | 10/2002 | Lavington et al. |
| 2004/0094902 A1 | * | 5/2004 | Brunke ............... F16J 9/206 |
| | | | 277/460 |
| 2004/0134457 A1 | | 7/2004 | Evans |
| 2008/0053396 A1 | | 3/2008 | Hiraishi et al. |

FOREIGN PATENT DOCUMENTS

| | | |
|---|---|---|
| DE | 102010045221 A1 | 3/2012 |
| EP | 1248022 A2 | 10/2002 |
| EP | 2551503 A1 | 1/2013 |
| FR | 1304041 A | 9/1962 |
| GB | 1042090 A | 9/1966 |
| JP | 56110541 A | 9/1981 |
| JP | 6124876 A | 2/1986 |
| JP | 2001336447 A | 12/2001 |
| JP | 2009243357 A | 10/2009 |
| NL | 39704 C | 12/1936 |
| WO | 9730277 | 8/1997 |

OTHER PUBLICATIONS

U.S. Appl. No. 14/298,869, filed Jun. 6, 2014, Donahue.
U.S. Appl. No. 14/452,509, filed Aug. 5, 2014, Donahue.
U.S. Appl. No. 14/452,515, filed Aug. 5, 2014, Donahue.
U.S. Appl. No. 14/595,013, filed Jan. 12, 2015, Donahue.
Dykes, "Pressure-Backed Piston Rings, Passage", Pressure-Backed Piston Rings, pp. 2-22, 1951.
European Search Report and Opinion issued in connection with related EP Application No. 15170678.5 on Aug. 7, 2015.
European Search Report and Opinion issued in connection with related EP Application No. 15170677.7 on Aug. 7, 2015.
European Search Report and Opinion issued in connection with related EP Application No. 15179639.8 on Dec. 17, 2015.
European Search Report and Opinion issued in connection with related EP Application No. 15179641.4 on Dec. 17, 2015.
US Non-Final Office Action issued in connection with Related U.S. Appl. No. 14/452,509 on Feb. 1, 2016.
European Search Report and Opinion issued in connection with Related EP Application No. 16150208.3 on Mar. 31, 2016.
European Search Report and Opinion issued in connection with corresponding EP Application No. 15169854.5 on Nov. 6, 2015.

* cited by examiner

PISTON ASSEMBLY FOR A RECIPROCATING ENGINE

BACKGROUND

The subject matter disclosed herein relates generally to reciprocating engines, and, more particularly to a piston assembly for a reciprocating engine.

A reciprocating engine (e.g., a reciprocating internal combustion engine) combusts fuel with an oxidant (e.g., air) to generate hot combustion gases, which in turn drive a piston (e.g., a reciprocating piston) within a cylinder or piston liner. In particular, the hot combustion gases expand and exert a pressure against the piston that linearly moves the piston from a top portion to a bottom portion of the cylinder during an expansion stroke. The piston converts the pressure exerted by the combustion gases and the piston's linear motion into a rotating motion (e.g., via a connecting rod and a crankshaft coupled to the piston) that drives one or more loads, e.g., an electrical generator. The construction of the piston and associated structures (e.g., a piston assembly) can significantly impact exhaust emissions (e.g., unburned hydrocarbons) and engine efficiency, as well as lubricant (e.g., oil) consumption. Furthermore, the construction of the piston assembly can significantly affect friction between components of the reciprocating engine and the life of the components of the reciprocating engine. Therefore, it would be desirable to improve the construction of the piston assembly.

BRIEF DESCRIPTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In one embodiment, a power cylinder system for a reciprocating engine includes a cylinder having an inner wall and defining a cavity. The system also includes a piston disposed within the cylinder and configured to move in a reciprocating manner within the cylinder. A top-most groove extends circumferentially about the piston beneath a top land of the piston, and the top-most groove is defined by a top surface, a bottom surface, and an inner surface extending between the top surface and the bottom surface. A ring is disposed within the top-most groove, and the ring includes a back face disposed proximate to the inner surface of the top-most groove and a front face opposite the back face. The front face has a tapered profile and is configured to contact the inner wall of the cylinder as the piston moves within the cylinder. The piston assembly also includes one or more radial channels formed in the top land or the ring, and the one or more channels are configured to enable a fluid to flow from the cavity to a space between the inner surface of the top-most groove and the back face of the ring.

In a second embodiment, a power cylinder system for a reciprocating engine includes a piston with a top-most groove extending circumferentially about the piston. The top-most groove includes one or more channels spaced apart circumferentially about the top-most groove and extending inward from an outer perimeter of the piston assembly. The system also includes a ring positioned in the top-most groove, the ring including a top face, a bottom face, an inner circumferential face, and an outer circumferential face that tapers between the top face and the bottom face. A space is defined between a portion of the top-most groove and the inner circumferential face of the ring, and the space is in fluid communication with the one or more radial channels.

In a third embodiment, a power cylinder system for a reciprocating engine includes a piston having a top-most groove extending circumferentially about the piston. The reciprocating engine also includes ring disposed within the top-most groove. The ring has an outer circumferential face that is tapered along at least a portion of the height of the ring. A top face of the ring and a top surface of the top-most groove are separated by an axial distance, and one or more radial channels formed in the top face of the ring, the top surface of the top-most groove, or a combination thereof, cause the axial distance to vary about the circumference of the ring.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
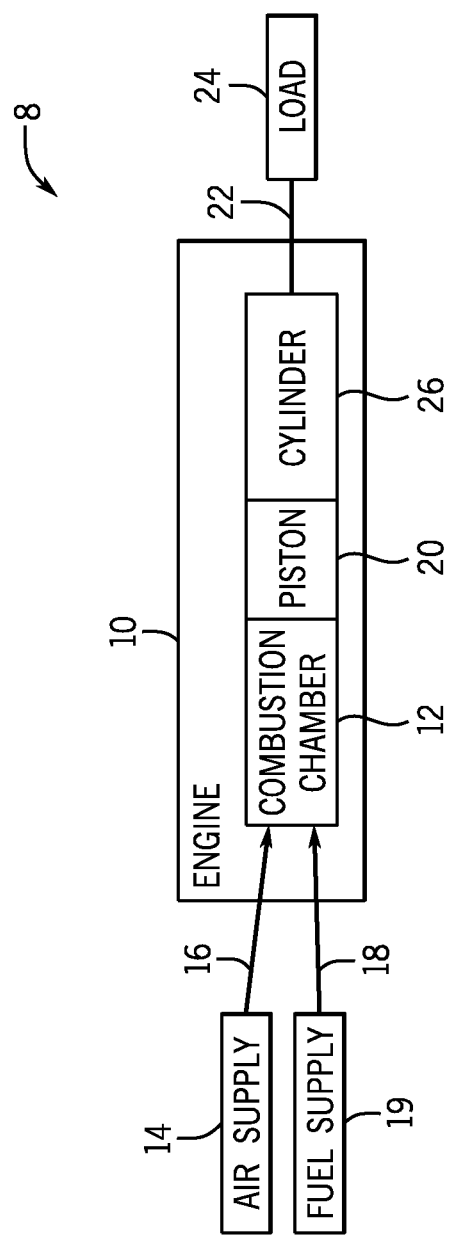
FIG. 1 is a schematic block diagram of an embodiment of a portion of an engine driven power generation system.

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

Power cylinder systems for reciprocating engines (e.g., reciprocating internal combustion engines) in accordance with the present disclosure may include one or more pistons each configured to move linearly within a cylinder (e.g., a liner) to convert pressure exerted by combustion gases and the piston's linear motion into a rotating motion to power one or more loads. Each piston may have a top groove (e.g., a top ring groove or a top-most ring groove) extending circumferentially about the piston, and a top ring (e.g., a top piston ring) may be disposed within the top groove. The top ring may advantageously have an asymmetrical profile (e.g., an asymmetrical cross-section), such as a tapered profile or partially tapered profile, that is configured to effectively and efficiently scrape oil from an inner wall of the cylinder during a down-stroke (e.g., an expansion stroke) of the piston. This asymmetrical profile (e.g., an asymmetrical cross-section), such as a tapered profile or partially tapered profile, also has the advantageous effect of reducing pressure loads on the liner which reduces friction. However, the tapered profile or partially tapered profile may cause a pressure gradient across the top ring (e.g., between an outer face and an inner face of the top ring). Without the disclosed embodiments, certain pressure gradients across the top ring may, in turn, cause radial ring collapse (e.g., movement of the top ring away from the inner wall of the cylinder), increased oil consumption, increased blowby of unburned hydrocarbons, increased emissions, and/or increased friction between the top ring and the inner wall of the cylinder, for example. Thus, embodiments of the present disclosure include one or more channels to transfer high pressure combustion gases to a space adjacent to the inner face of the top ring, such that the combustion gases exert a radially-outward directed force on the inner face of the top ring. Advantageously, the piston having the features disclosed herein may effectively and efficiently scrape a lubricant (e.g., oil) from the inner wall of the cylinder, while blocking radial ring collapse, as well as reducing blowby, oil consumption, emissions, and/or friction between components, which may result in less wear and scuffing, for example.

Turning to the drawings, FIG. 1 illustrates a block diagram of an embodiment of a portion of an engine driven power generation system 8. As described in detail below, the system 8 includes an engine 10 (e.g., a reciprocating internal combustion engine) having one or more combustion chambers 12 (e.g., 1, 2, 3, 4, 5, 6, 7, 8, 10, 12, 14, 16, 18, 20, or more combustion chambers 12). An air supply 14 is configured to provide a pressurized oxidant 16, such as air, oxygen, oxygen-enriched air, oxygen-reduced air, or any combination thereof, to each combustion chamber 12. The combustion chamber 12 is also configured to receive a fuel 18 (e.g., a liquid and/or gaseous fuel) from a fuel supply 19, and a fuel-air mixture ignites and combusts within each combustion chamber 12. The hot pressurized combustion gases cause a piston 20 adjacent to each combustion chamber 12 to move linearly within a cylinder 26 and convert pressure exerted by the gases into a rotating motion, which causes a shaft 22 to rotate. Together, the piston 20 and the cylinder 26 may form a power cylinder system for the engine 10. Further, the shaft 22 may be coupled to a load 24, which is powered via rotation of the shaft 22. For example, the load 24 may be any suitable device that may generate power via the rotational output of the system 10, such as an electrical generator. Additionally, although the following discussion refers to air as the oxidant 16, any suitable oxidant may be used with the disclosed embodiments. Similarly, the fuel 18 may be any suitable gaseous fuel, such as natural gas, associated petroleum gas, propane, biogas, sewage gas, landfill gas, coal mine gas, for example.

The system 8 disclosed herein may be adapted for use in stationary applications (e.g., in industrial power generating engines) or in mobile applications (e.g., in cars or aircraft). The engine 10 may be a two-stroke engine, three-stroke engine, four-stroke engine, five-stroke engine, or six-stroke engine. The engine 10 may also include any number of combustion chambers 12, pistons 20, and associated cylinders (e.g., 1-24). For example, in certain embodiments, the system 8 may include a large-scale industrial reciprocating engine having 4, 6, 8, 10, 16, 24 or more pistons 20 reciprocating in cylinders. In some such cases, the cylinders and/or the pistons 20 may have a diameter of between approximately 13.5-34 centimeters (cm). In some embodiments, the cylinders and/or the pistons 20 may have a diameter of between approximately 10-40 cm, 15-25 cm, or about 15 cm. In certain embodiments, the piston 20 may be a steel piston or an aluminum piston with a Ni-resist ring insert in a top ring groove of the piston 20. The system 8 may generate power ranging from 10 kW to 10 MW. In some embodiments, the engine 10 may operate at less than approximately 1800 revolutions per minute (RPM). In some embodiments, the engine 10 may operate at less than approximately 2000 RPM, 1900 RPM, 1700 RPM, 1600 RPM, 1500 RPM, 1400 RPM, 1300 RPM, 1200 RPM, 1000 RPM, or 900 RPM. In some embodiments, the engine 10 may operate between approximately 800-2000 RPM, 900-1800 RPM, or 1000-1600 RPM. In some embodiments, the engine 10 may operate at approximately 1800 RPM, 1500 RPM, 1200 RPM, 1000 RPM, or 900 RPM. Exemplary engines 10 may include General Electric Company's Jenbacher Engines (e.g., Jenbacher Type 2, Type 3, Type 4, Type 6 or J920 FleXtra) or Waukesha Engines (e.g., Waukesha VGF, VHP, APG, 275GL), for example.

Figure 2:
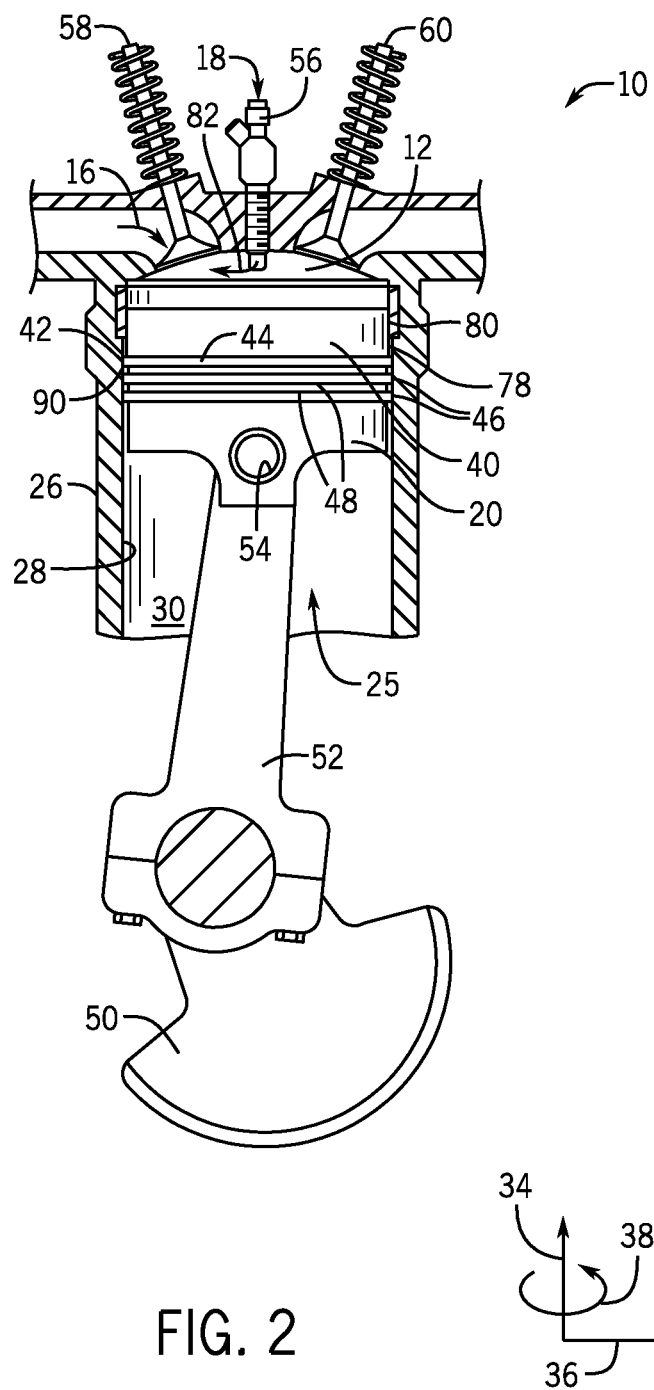
FIG. 2 is a cross-sectional view of an embodiment of a piston positioned within a cylinder of an engine.

FIG. 2 is a side cross-sectional view of an embodiment of a piston assembly 25 having a piston 20 disposed within a cylinder 26 (e.g., an engine cylinder) of the reciprocating engine 10. The cylinder 26 has an inner annular wall 28 defining a cylindrical cavity 30. The piston 20 may be described with reference to an axial axis or direction 34, a radial axis or direction 36, and a circumferential axis or direction 38. The piston 20 includes a top portion 40 (e.g., a top land) and a first annular groove 42 (e.g., a top groove or a top ring groove) extending circumferentially (e.g., in the circumferential direction 38) about the piston 20. A first ring 44 (e.g., a top ring or a top piston ring) may be positioned in the top groove 42. The top ring 44 may be configured to expand and contract in response to high temperatures and high pressure combustion gases to which the top ring 44 is subjected during operation of the system 10. As shown, the piston 20 includes a plurality of additional grooves 46 (e.g., additional ring grooves) extending circumferentially about the piston 20 and spaced apart from the top groove 42 and from one another along the axial axis 34. An additional piston ring 48 is positioned in each of the additional annular grooves 46. Various features are disclosed herein with respect to the top groove 42 and the top ring 44. However, it should be understood that the plurality of additional grooves 46 and the corresponding additional piston rings 48 may have any of a variety of configurations. For example, one or more of the plurality of additional grooves 46 and/or corresponding additional rings 48 may include some or all of the features disclosed below or may have different configurations, shapes, sizes, and/or functions, for example.

As shown, the piston 20 is attached to a crankshaft 50 via a connecting rod 52 and a pin 54. The crankshaft 50 translates the reciprocating linear motion of the piston 24 into a rotating motion. The combustion chamber 12 is positioned adjacent to the top land 40 of the piston 24. A fuel injector 56 provides the fuel 18 to the combustion chamber 12 and a valve 58 controls the delivery of air 16 to the combustion chamber 12. An exhaust valve 60 controls discharge of exhaust from the engine 10. However, it should be understood that any suitable elements and/or techniques for providing fuel 18 and air 16 to the combustion chamber 12 and/or for discharging exhaust may be utilized.

In operation, combustion of the fuel 18 with the air 16 in the combustion chamber 12 cause the piston 20 to move in a reciprocating manner (e.g., back and forth) in the axial direction 34 within the cavity 30 of the cylinder 26. As the piston 20 moves, the crankshaft 50 rotates to power the load 24 (shown in FIG. 1), as discussed above. A clearance 78 (e.g., a radial clearance defining an annular space) is provided between the inner wall 28 of the cylinder 26 and an outer surface 80 of the piston 20. The top ring 44 is configured to protrude radially outward from the top groove 42 into the clearance 78 and to contact the inner wall 28 of the cylinder 26. The top ring 44 generally blocks the fuel 18 and the air 16, or a fuel-air mixture 82, from escaping from the combustion chamber 12 and/or facilitates maintenance of suitable pressure to enable the expanding hot combustion gases to cause the reciprocating motion of the piston 20. Furthermore, the top ring 44 generally facilitates scraping and distribution of lubricant (e.g., oil), which coats the inner wall 28 and which controls heat and/or friction within the engine 10, for example. Thus, it would be desirable for the top ring 44 to have a shape that enables the top ring 44 to effectively and efficiently scrape oil from the inner wall 28, as well as other features to facilitate maintenance of contact between the top ring 44 and the inner wall 28 to prevent blowby of any fluids (e.g., hot combustion gases, fuel, air, or the like).

In accordance with present embodiments, the top ring 44 may have an outer face 90 (e.g., an outer circumferential face) with an asymmetrical profile (e.g., an asymmetrical cross-section), such as a tapered annular profile (e.g., a tapered annular outer face) or a partially tapered profile (e.g., a partially tapered annular outer face). For example, the outer annular face 90 may have a frustoconical shape, a curved annular shape, or both. Such a configuration enables the top ring 44 to effectively and efficiently scrape oil from the inner wall 28 during a down-stroke of the piston 20, and thus, also reduces overall oil consumption within the engine 10. However, as discussed in more detail below, the hot pressurized combustion gases (e.g., combustion gases) from the combustion chamber 12 contact the tapered annular outer face 90 and exert a force that drives the top ring 44 radially-inward (e.g., along the radial axis 36) away from the inner wall 28 of the cylinder 26. Thus, various features that may enable the top ring 44 having the tapered annular outer face 90 to maintain contact with the inner wall 28 of the cylinder 26 are disclosed herein.

Figure 3:
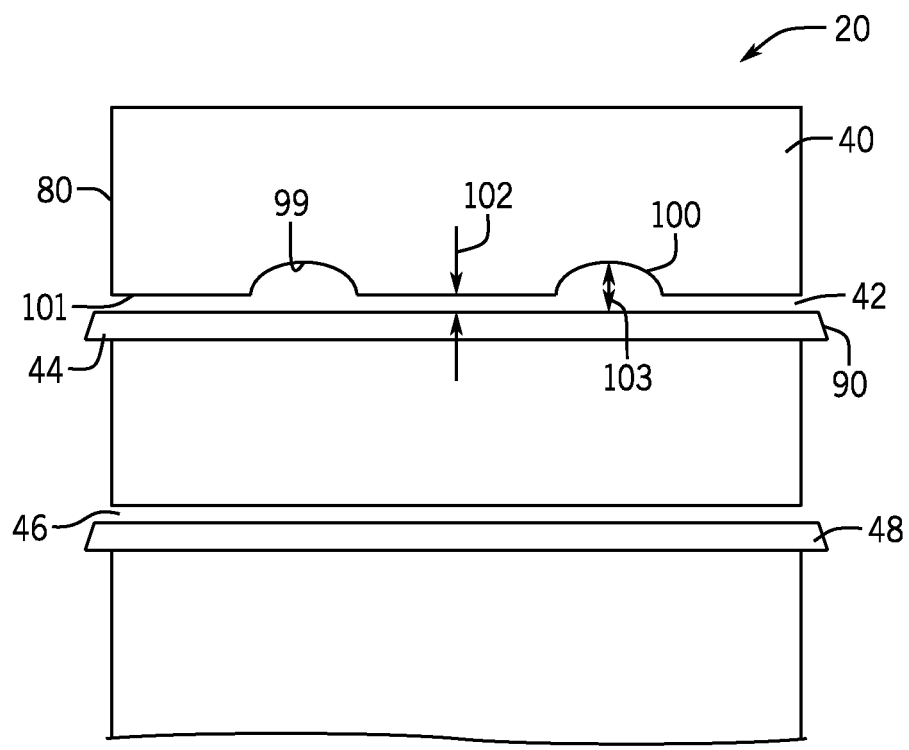
FIG. 3 is a side view of a portion of an embodiment of a piston having radial channels formed in a top land of the piston.
Figure 3:
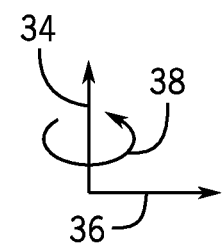

FIG. 3 is a side view of a portion of an embodiment of the piston 20 having radial channels 100 (e.g., passageways, troughs, grooves, or the like) formed in the top land 40 of the piston 20. As shown, the radial channels 100 are formed at discrete locations about the piston 20 (e.g., discrete locations that are spaced apart circumferentially about the piston 20). As shown, the radial channels 100 have a curved cross-section (e.g., have a curved wall 99) and are formed into or along an axially-facing surface 101 (e.g., an annular surface), which corresponds to both a bottom surface of the top land 40 and an upper surface (e.g., top surface or a top perimeter) of the top groove 42. The radial channels 100 may extend radially-inward (e.g., in the radial direction 36) from the outer surface 80 (e.g., an outer annular surface) of the top land 40 of the piston 20. As shown, the radial channels 100 are open toward the top groove 42, and an axial distance 102 between the top ring 44 and the upper surface 104 of the top groove 42 is increased along the radial channels 100 (e.g., as shown by a first axial distance 102 and a second axial distance 103, greater than the first axial distance 102, coincident with the radial channels 100). Thus, the axial distance between the top ring 44 and the upper surface 101 of the top groove 42 varies circumferentially about the top ring 44. As discussed in more detail below, such a configuration facilitates transfer of the combustion gases from the cavity 30 along the radial channels 100 to a space (shown in FIG. 4), where the combustion gases exert a radially-outward force (e.g., a pressure-induced biasing force) against an inner face (shown in FIG. 4) of the top ring 44. Thus, the radial channels 100 may facilitate control of a pressure gradient across the top ring 44 and may enable the top ring 44 having the tapered annular outer face 90 to maintain contact with the inner wall 28 of the cylinder 26.

Figure 4:
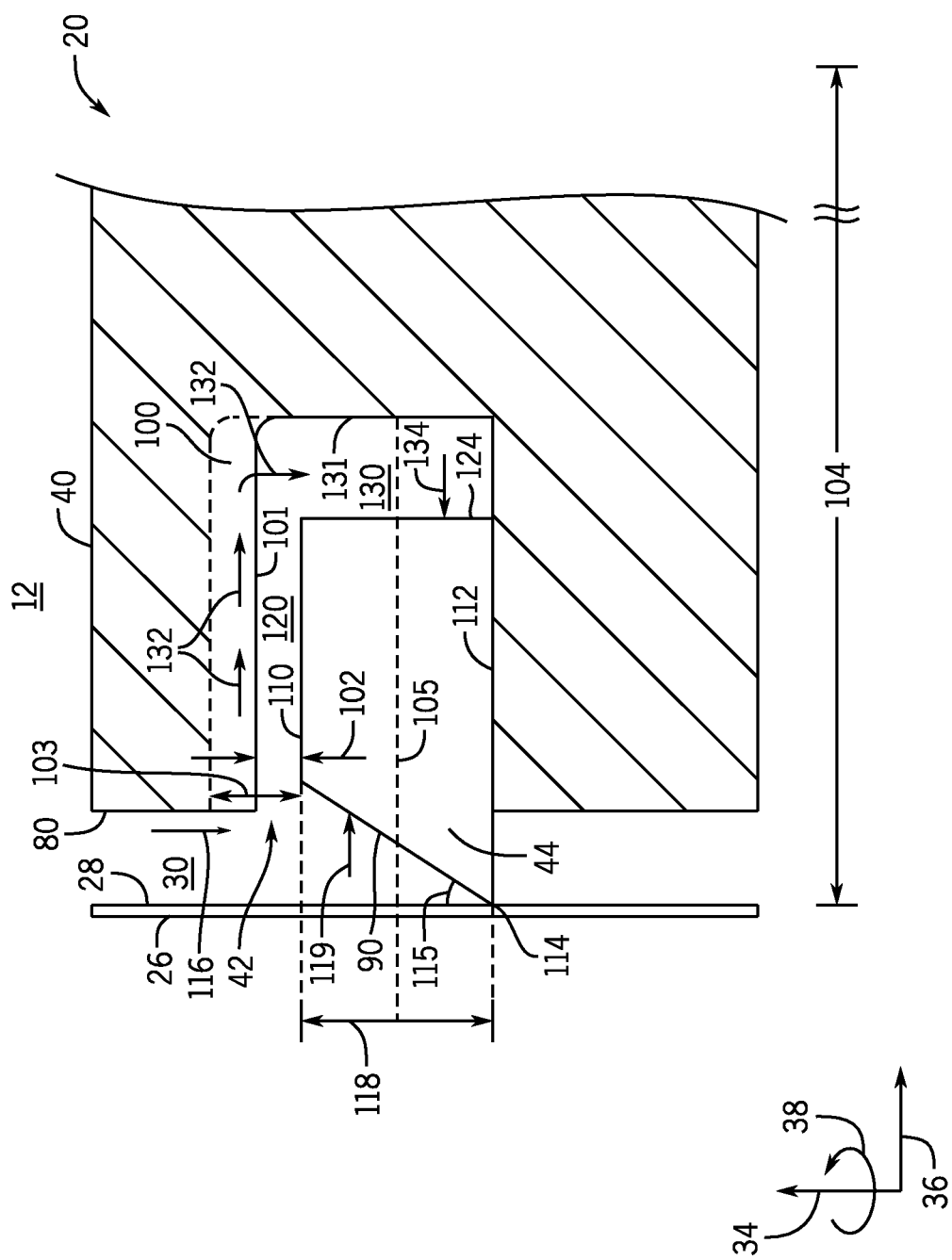
FIG. 4 is a side cross-sectional view of a portion of an embodiment of a top piston ring having a tapered outer face positioned within a top groove of a piston.

With the foregoing in mind, FIG. 4 is a side cross-sectional view of a portion of an embodiment of the top ring 44 having the tapered annular outer face 90 (e.g., a frusto-concial face), wherein the top ring 44 is positioned within the top groove 42 of the piston 20. In the illustrated embodiment, the top ring 44 has an asymmetrical profile (e.g., an asymmetrical cross-section) and is asymmetrical about a radial line 105. The tapered annular outer face 90 of the top ring 44 generally facilitates effective and efficient scraping of oil along the inner wall 28 of the cylinder 26 during a down-stroke. As shown, a radius 104 (and thus a diameter) of the top ring 44 increases between a top face 110 (e.g., an axially-upper face) and a bottom face 112 (e.g., an axially-lower face) of the top ring 44. In the illustrated embodiment, the tapered annular outer face 90 has an angled linear profile, and the smallest radius 104 of the top ring 44 coincides with the top face 110, while the largest radius 104 of the top ring 44 coincides with the bottom face 112. In such a configuration, the outer surface 90 is configured to contact the inner wall 28 to form an annular sealing point 114 (e.g., an annular seal) at or proximate to the bottom face 112 of the top ring 44. It should be understood that the radius 104 may vary in a linear manner (as shown) or in a non-linear manner (e.g., curved). The outer face 90 may be positioned at any suitable angle, such a an angle 115 that is greater than approximately 1.5 degrees relative to the inner wall 28 of the cylinder 26. In some embodiments, the angle 115 may be greater than 1, 2, 3, 4, or 5 degrees. In certain embodiments, the angle 115 may be between about 1 and 15 degrees, 1.25 and 10 degrees, or 1.5 and 5 degrees.

Additionally, in such a configuration, the combustion gases exert pressure on the tapered annular outer face 90 across a height 118 of the top ring 44. For example, the combustion gases flow toward the tapered annular outer face 90 as shown by arrow 116, and thus, generate a radially-inward force 119 that drives the top ring 44 radially-inward (e.g., in the radial direction 36). An annular gap 120 provided between the top face 110 of the top ring 44 and the upper surface 101 of the top groove 42 may enable some expansion of the top ring 44 within the top groove 42. However, the gap 120 may not enable an efficient transfer of the combustion gases to a radially-inner face 124 (e.g., an inner circumferential face) of the top ring 44 as it may be desirable for the first distance 102 (e.g., an annular clearance) between the top face 110 of the top ring 44 and the upper surface 101 of the top groove 42 to be minimal to control ring flutter and/or lift and to maintain ring stability, for example.

As discussed above, the top ring 44 having the tapered annular outer face 90 may be used in conjunction with one or more radial channels 100 that are configured to facilitate transfer of combustion gases to a space 130 (e.g., an annular chamber) adjacent to the inner face 124 of the top ring 44. For example, 1, 2, 3, 4, 5, 6, 7, 8, 9, 10, or more radial channels 100 may be distributed with a uniform circumferential spacing about the piston 20 to the space 130. The space 130 may be positioned adjacent to or defined by the inner face 124 of the top ring 44 and an inner surface 131 (e.g., an inner annular wall) of the top groove 42. In such cases, the upper surface 101 of top groove 42 and the top ring 44 are separated by the first distance 102 about some or most of the circumference of the top ring 44, thus controlling ring flutter and/or lift and maintaining ring stability, while the combustion gases are permitted to flow from the cavity 30 and along the radial channels 100 into the space 130, as shown by arrow 132. Thus, the pressure gradient across the top ring 44 may be reduced (e.g., the pressure gradient between the tapered annular outer face 90 and the inner face 124), and the combustion gases may exert a radially-outward force 134 that drives the top ring 44 radially-outward (e.g., along the radial axis 36) to counter the radially-inward force 119 exerted against the tapered annular outer face 90.

Such a configuration may enable use of the top ring 44 with the tapered annular outer face 90, which may effectively and efficiently scrape oil from the inner wall 28 of the cylinder 26 during a down-stroke, while also enabling the top ring 44 to maintain contact with the inner wall 28 of the cylinder 26. Thus, oil consumption, blowby, and radial ring collapse may be reduced. Furthermore, such a configuration may reduce friction within the engine 10 (e.g., between the top ring 44 and the inner wall 28 of the cylinder 26) because the radially-outward force 134 that drives the top ring 44 radially-outward (e.g., along the radial axis 36) is balanced by a substantially equal radially-inward force 119 exerted against the tapered annular outer face 90. These balanced forces also reduce wear and scuffing of various components and portions (e.g., the outer face 90 of the top ring 44 and the inner wall 28 of the cylinder 26) of the engine 10.

Figure 5:
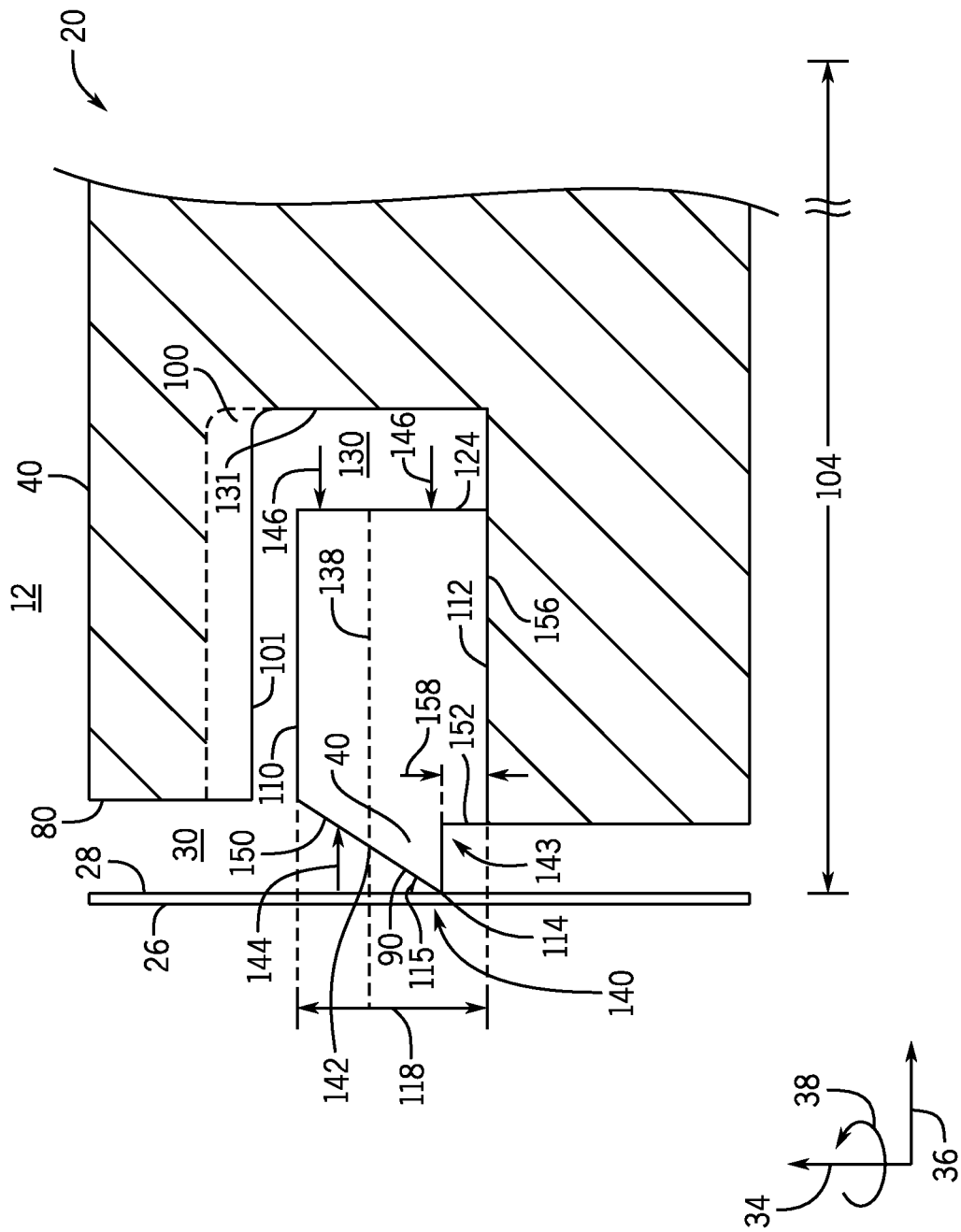
FIG. 5 is a side cross-sectional view of a portion of an embodiment of a top piston ring having a partially tapered outer face positioned within a top groove of a piston.

FIG. 5 is a side cross-sectional view of a portion of an embodiment of the top ring 44 positioned within the top groove 42 of the piston 20, wherein the outer face 90 of the top ring is partially tapered (e.g., a partially tapered annular outer face or frustoconical face). The top ring 44 has an asymmetrical profile (e.g., an asymmetrical cross-section) about a radial line 138. In such cases, the largest radius 104 of the top ring 44 coincides with an intermediate portion 140 of the top ring 44 positioned along the height 118 of the top ring 44 and between the top face 110 and the bottom face 112. In some embodiments, the intermediate portion 140 may be positioned between a midpoint 142 (e.g., a point located halfway axially between the top face 110 and the bottom face 112 along the height 118) and the bottom face 112 of the top ring 44. In some embodiments, the top ring 44 may be configured such that the radius 104 increases from the top face 110 to the intermediate portion 140, and the annular sealing point 114 may be formed between the intermediate portion 140 and the inner wall 28 of the cylinder 26. In some such cases, the radius 104 of the top ring 44 may decrease from the intermediate portion 140 to the bottom face 112 in a linear, stepped, or notched manner.

For example, as shown, an annular notch 143 is provided between the intermediate portion 140 and the bottom face 112.

As shown, the partially tapered annular outer face 90 includes an upper portion 150 (e.g., between the intermediate portion 140 and the top face 110) and a lower portion 152 (e.g., between the intermediate portion 140 and the bottom face 112). In such cases, features of the top ring 44 and the top groove 42 may be used to adjust and/or to control a pressure gradient across the top ring 44. For example, as shown, the combustion gases exert a radially-inward force 144 that drives the upper portion 150 radially-inward (e.g., in the radial direction 36). The combustion gases may flow through the radial channels 100 to the space 130 adjacent to the inner face 124 of the top ring 44 and may exert a radially-outward force 146 that drives the top ring 44 radially-outward (e.g., in the radial direction 36) to counter the radially-inward force 144. Additionally, a pressure differential across the bottom portion 152 of the top ring 44 may be controlled. For example, the pressure adjacent to the bottom portion 152 of the partially tapered annular outer face 90 may be relatively low, as the sealing point 114 of the top ring 44 generally blocks transfer of the combustion gases into the cavity 30 adjacent to the bottom portion 152. However, the pressure adjacent to the bottom portion 152 of the inner surface 124 may be greater than the pressure adjacent to the bottom portion 152 of the outer surface 90 as the combustion gases that flow in the space 130 via the radial channels 100 may exert a radially-outward force 146 against the bottom portion 152 of the inner face 124. Thus, the radially-outward force 152 is greater than the radially-inward force 144. Such a configuration urges the top ring 44 radially-outward and enables the top ring 44 to maintain contact with the inner wall 28 of the cylinder 26.

Furthermore, the pressure gradient may also be controlled (e.g., via the shape of the top ring 44 and/or the radial channels 100) to reduce friction within the engine 10, such as friction between the top ring 44 and the inner wall 28 of the cylinder 26. Different profiles of the top ring 44 and/or different volumes of the radial channels 100, for example, may enable control of the pressure gradient across the top ring 44 to block radial ring collapse and/or reduce friction. For example, as an axial distance 158 between the sealing point 114 and the bottom face 112 decreases, the pressure differential force across the bottom portion 152 of the top ring 44 may also decrease. Accordingly, the top ring 44 may maintain contact with the inner wall 28 of the cylinder 26, while friction between the top ring 44 and the inner wall 28 of the cylinder 26 is also controlled by adjusting the profile and/or geometry of the top ring 44. In some embodiments, where the intermediate portion 140 is configured to form the sealing point 114 with the inner wall 28 of the cylinder 26, the intermediate portion 140 may be positioned relative to the top face 110 at approximately 60%, 65%, 70%, 75%, 80%, 85%, 90%, or 95%, or greater, of the height 118 of the top ring 44. Additionally, as discussed above, the upper portion 150 of the outer face 90 may be positioned at any suitable angle relative to the inner wall 28 of the cylinder 26, such as greater than 1, 1.5, 2, 3, 4, 5, or more degrees. In some embodiments, the angle 115 may be between about 1 and 15 degrees, 1.25 and 10 degrees, or 1.5 and 5 degrees.

Figure 6:
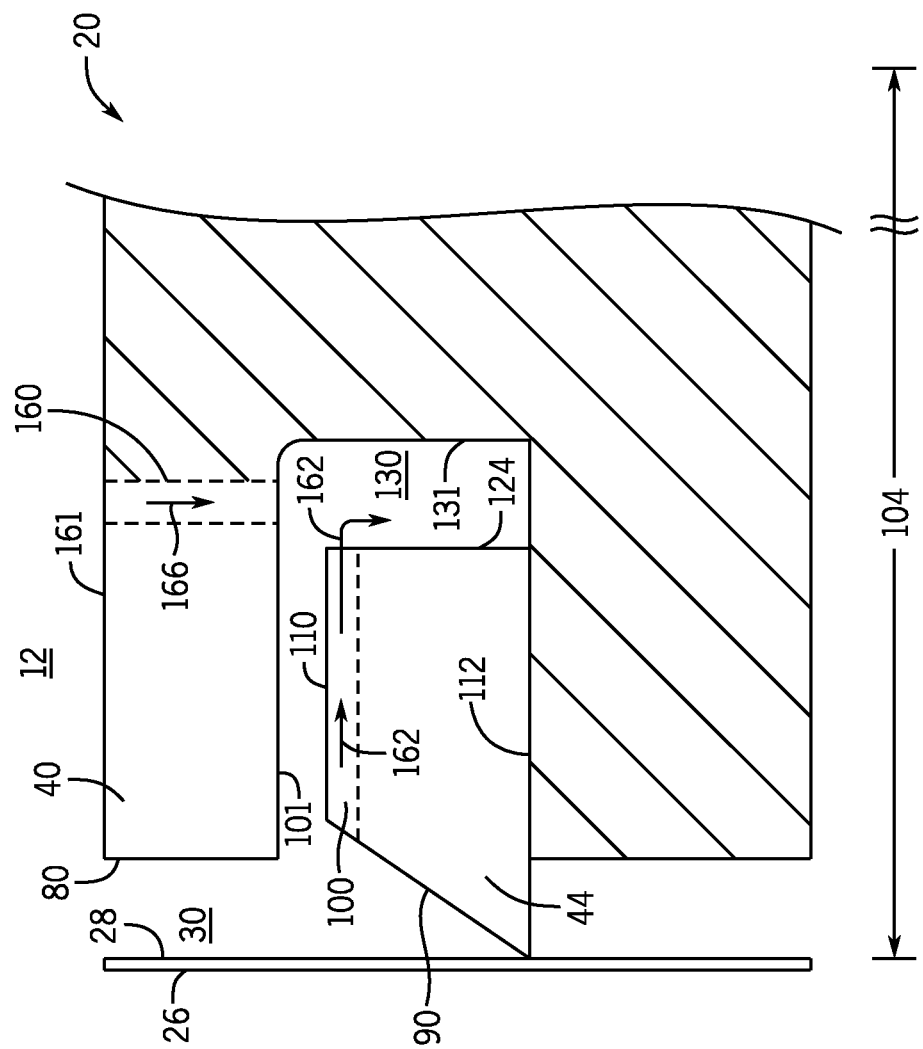
FIG. 6 is a side cross-sectional view of a portion of an embodiment of a piston having radial channels formed in a top piston ring and axial channels formed in a top land of the piston.

FIG. 6 illustrates an embodiment of the piston 20 having a radial channel 100 formed in the top ring 44 and an axial channel 160 formed through the top land 40 of the piston 20. In certain embodiments, radial channels 100 may be formed along the top face 110 of the top ring 44 and/or axial channels 160 may be provided through the top land 40 of the piston 20. Such channels may be provided in addition to or as an alternative to the radial channels 100 formed in the top land 40 of the piston 20, as shown in FIGS. 2-5, for example.

As shown, the radial channels 100 formed in the top ring 44 may extend radially-inward (e.g., in the radial direction 36) from the partially tapered annular outer face 90 to the inner face 124 of the top ring 44. The radial channels 100 may increase the axial distance 102 between the top face 110 of the top ring 44 and the upper surface 101 of the top groove 42 along the radius 104 coincident with the radial channel 100. Thus, the radial channel 100 may facilitate flow of the combustion gases from the cavity 30 to the space 130 adjacent to the inner face 124, as shown by arrow 162. As discussed above, the transfer of gases to the space 130 may control the pressure differential between the tapered annular outer face 90 and the inner face 124 of the top ring 44, and thus enable the top ring 44 having the tapered or partially tapered annular outer face 90 to maintain contact with the inner wall 28 of the cylinder 26.

Furthermore, the axial channel 160 is shown extending in the axial direction 34 from a top surface 161 of the piston 20 through the top land 40 to the space 130. Thus, the axial channel 160 may facilitate flow of the combustion gases from the combustion chamber 12 to the space 130 adjacent to the inner face 124, as shown by arrow 166. As discussed above, the transfer of gases to the space 130 may control the pressure differential between the outer face 90 and the inner face 124 of the top ring 44, and thus enable the top ring 44 having the tapered or partially tapered annular outer face 90 to maintain contact with the inner wall 28 of the cylinder 26.

As set forth above, the radial channels 100 and/or the axial channels 160 may help to equalize pressures or create pressure differential between the inner face 124 of the top ring 44 and the outer face 90 of the top ring 44, thereby helping to bias the top ring 44 radially-outward against the cylinder 26 to block radial ring collapse and/or blowby, for example. Additionally, the top ring 44, the radial channels 100, and/or the axial channels 160 may be constructed to block radial ring collapse and blowby, while also limiting friction between various components of the engine 10. Although the radial channels 100 and/or the axial channels 160 are illustrated in various positions within the engine 10, it should be understood that the radial channels 100 and/or the axial channels 160 may be positioned in any suitable location to facilitate transfer of combustion gases to the space 130 adjacent to the inner face 124 of the top ring 44. Additionally, any suitable number of radial channels 100 and/or axial channels 160 may be provided. For example, 1, 2, 3, 4, 5, 6, 7, 8, 9, 10 or more radial channels 100 may be provided and/or 1, 2, 3, 4, 5, 6, 7, 8, 9, 10 or more axial channels 160 may be provided. The radial channels 100 in the top ring 44, the radial channels 100 in the upper surface 101 of the top groove 42, and/or the axial channels 160 may be spaced apart at discrete locations about the circumference of the piston 20, and in some cases, may be spaced apart at uniform distances from one another. Furthermore, various low friction coatings may be utilized in addition to the radial channels 100 and/or the axial channels 160 disclosed herein.

Technical effects of the disclosed embodiments include providing systems for controlling the distribution of combustion gases within the engine 10 via channels, such as radial channels 100 and/or axial channels 160. For example, the combustion gases may exert pressure against the tapered or partially tapered annular outer face 90 of the top ring 44 of the piston assembly. Radial channels 100 formed in the top land 40 or in the top ring 44 may transfer the combustion gases to the space 130 adjacent to the inner surface 124 of the top ring 44, thus controlling a pressure gradient between the tapered outer face 90 and the inner face 124 and enabling the top ring 44 having the tapered or partially tapered annular outer face 90 to maintain contact with the inner wall 28 of the cylinder 26. Such a configuration may also advantageously reduce oil consumption, emissions, blowby, radial ring collapse, and/or friction within the engine 10.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A power cylinder system for a reciprocating engine, comprising:
   a piston configured to be disposed within a cylinder having an inner wall and defining a cavity and configured to move in a reciprocating manner within the cylinder;
   a top-most groove extending circumferentially about the piston beneath a top land of the piston, wherein the top-most groove is defined by a top surface, a bottom surface, and an inner surface extending between the top surface and the bottom surface;
   a ring disposed within the top-most groove, wherein the ring comprises an inner face disposed proximate to the inner surface of the top-most groove and an outer face opposite the inner face, wherein the outer face comprises a tapered profile and is configured to contact the inner wall of the cylinder as the piston moves within the cylinder; and
   one or more channels formed in the top land or an upper face of the ring, wherein the one or more channels are configured to enable combustion gases to flow from the cavity to a space defined by the inner surface of the top-most groove and the inner face of the ring and to enable the combustion gases flowing through the one or more channels to contact the inner face of the ring.

2. The system of claim 1, wherein at least some of the one or more channels extend radially in the top surface of the top-most groove to the space, and the one or more channels are positioned at one or more discrete locations about the circumference of the top-most groove.

3. The system of claim 1, wherein at least some of the one or more channels extend axially through the top land of the piston to the space.

4. The system of claim 1, wherein a radius of the ring increases from a top axially-facing surface to a bottom axially-facing surface of the ring such that a smallest radius of the ring coincides with the top axially-facing surface and a largest radius of the ring coincides with the bottom axially-facing surface, the bottom axially-facing surface is flat and is configured to contact the bottom surface of the top-most groove, and the bottom axially-facing surface and the outer face of the ring form a sealing point that is configured to contact the inner wall of the cylinder.

5. The system of claim 1, wherein the outer face of the ring is positioned at an angle greater than approximately 1.5 degrees relative to the inner wall of the cylinder.

6. The system of claim 1, wherein a sealing point at which the outer face of the top ring contacts the inner wall of the cylinder is positioned between a top face and a bottom face of the ring, the ring comprises a notch between the sealing point and the bottom face of the ring, the bottom face is configured to contact the bottom surface of the top-most groove, the sealing point is located a first axial distance from the top face of the ring, and the first axial distance is approximately 75 to 99 percent of a height of the ring.

7. The system of claim 1, wherein the cavity defined by the cylinder comprises a diameter of between approximately 13.5 and 34 centimeters.

8. The system of claim 1, wherein one or more channels and the ring are configured to enable the combustion gases that flow through the one or more channels to the space to exert a radially-outward force on the inner face of the ring that substantially balances a radially-inward force exerted by another flow of combustion gases against the outer face of the ring.

9. The system of claim 1, comprising the cylinder.

10. The system of claim 1, wherein a radius of the ring increases linearly from the upper face of the ring to an intermediate portion of the ring located a first axial distance from the upper face of the ring, and wherein the radius of the ring decreases from the intermediate portion to a bottom face of the ring.

11. The system of claim 10, wherein the first axial distance is between approximately 75 to 99 percent of a height of the ring.

12. The system of claim 1, wherein at least some of the one or more channels are formed in the upper face of the ring.

13. The system of claim 1, wherein the one or more channels comprises at least two channels.

14. The system of claim 1, wherein the piston comprises steel.

15. The system of claim 1, wherein the piston comprises aluminum.

* * * * *